United States Patent
Calabro

(10) Patent No.: US 6,901,740 B2
(45) Date of Patent: Jun. 7, 2005

(54) ENGINE WITH A CENTRAL SPIKE FOR A SPACE LAUNCHER

(75) Inventor: Max Calabro, Villennes (FR)

(73) Assignee: Eads Launch Vehicles, Paris (FR)

( * ) Notice: Subject to any disclaimer, the term of this patent is extended or adjusted under 35 U.S.C. 154(b) by 107 days.

(21) Appl. No.: 10/436,140

(22) Filed: May 13, 2003

(65) Prior Publication Data

US 2003/0217552 A1 Nov. 27, 2003

(30) Foreign Application Priority Data

May 21, 2002 (FR) .................................. 02 06155

(51) Int. Cl.⁷ .............................. F02K 9/00; F02K 9/42; F02K 9/72

(52) U.S. Cl. .................... 60/257; 60/770; 60/200.1; 239/265.13

(58) Field of Search .................. 60/770, 771, 200.1, 60/257, 242; 239/265.19, 265.33, 265.43, 265.13

(56) References Cited

U.S. PATENT DOCUMENTS

| | | | | |
|---|---|---|---|---|
| 2,828,603 A | * | 4/1958 | Laucher ........................ 60/761 |
| 3,346,186 A | * | 10/1967 | Fulton et al. .................. 239/11 |
| 3,482,783 A | | 12/1969 | Nebiker et al. |
| 3,596,465 A | * | 8/1971 | Paine et al. .................... 60/770 |
| 3,711,027 A | * | 1/1973 | Carey ..................... 239/265.19 |
| 4,109,867 A | * | 8/1978 | Ebeling, Jr. ............. 239/265.15 |
| 4,162,040 A | * | 7/1979 | Carey ..................... 239/265.33 |
| 4,213,566 A | * | 7/1980 | Miltenberger .......... 239/265.43 |
| 4,349,155 A | * | 9/1982 | Donguy .................. 239/265.33 |
| 4,383,407 A | * | 5/1983 | Inman .......................... 60/771 |
| 4,387,564 A | * | 6/1983 | Carey ............................ 60/242 |
| 4,480,437 A | * | 11/1984 | Gauge .......................... 60/771 |
| 4,489,889 A | * | 12/1984 | Inman ................... 239/265.33 |
| 5,048,289 A | * | 9/1991 | Brown ......................... 60/267 |
| 5,282,576 A | * | 2/1994 | Chatenet et al. ....... 239/265.33 |
| 5,640,844 A | * | 6/1997 | Pahl ............................. 60/259 |
| 6,205,772 B1 | * | 3/2001 | Perrier et al. ................. 60/770 |
| 6,418,710 B1 | * | 7/2002 | Perrier et al. ................. 60/771 |
| 6,691,505 B2 | * | 2/2004 | Harvey et al. ................ 60/253 |
| 2003/0136128 A1 | * | 7/2003 | Groeber et al. ............... 60/771 |

FOREIGN PATENT DOCUMENTS

| | | |
|---|---|---|
| EP | 0018300 | 10/1980 |
| FR | 1460610 | 3/1966 |
| FR | 2422831 | 11/1979 |
| GB | 2013787 | 8/1979 |

OTHER PUBLICATIONS

M. Calabro J.B. Perie, M.T. Prodhomme, EADS Launch Vehicles, Les Mureaux, France, AIAA 2001–3692. "Innovative Upper Stage Propulsion Concepts For Future Launchers," 37th AIAA/ASME/SAE/ASEE JPC Conference & Exhibit, Jul. 8–11, 2001—Salt Lake City, Utah, pp. 1–9.

G. Hagemann, et al.; "Advanced Rocket Nozzles," Journal of Propulsion and Power, American Institute of Aeronautics and Astronautics, New York, US, vol. 14, No. 5, Sep. 1, 1998, pp. 620–634, XP000778443, ISBN: 0748-4658.

* cited by examiner

Primary Examiner—Cheryl Tyler
Assistant Examiner—William H. Rodriguez
(74) Attorney, Agent, or Firm—Stevens, Davis, Miller & Mosher, LLP

(57) ABSTRACT

The pointed end of a central spike, used in an engine of a space launcher, may have a deformable structure that can adopt either a folded position or a deployed position.

7 Claims, 2 Drawing Sheets

ENGINE WITH A CENTRAL SPIKE FOR A SPACE LAUNCHER

FIELD OF THE INVENTION

The present invention relates to an engine with a central spike for a space launcher, of the type known in the art by the name of "aerospike".

BACKGROUND OF THE RELATED ART

Such an engine, particularly, although not exclusively, appropriate for propelling the upper stage of such a space launcher, is described for example in document AIAA 2001-3692 "Innovative Upper Stage Propulsion Concepts For Future Launchers" issued at the time of the 37$^{th}$ AIAA/ASME/SAE/ASEE JPC Conference and Exhibition held from Jul. 8 to 11, 2001 in Salt Lake City (Utah, USA).

The essential structural features of this aerospike engine are that such engines have a central spike and means generating pressurized gaseous flow, sending this flow onto the surface of said central spike. This central spike is coaxial with the longitudinal axis of the engine and comprises a functional lateral surface at least approximately in the shape of a cone, the base and the vertex of which are arranged respectively at said engine end and at the opposite end to said engine. For their part, said means of generating pressurized gaseous flows consist of a plurality of individual generators distributed around the axis of the engine, near the base of said central spike, so that the gaseous flows from said individual generators strike said lateral surface of the central spike.

Of course, the thrust of such an engine is the result of the application, to said functional surface of the spike, of the pressure exerted by said gaseous flows, and the larger this functional surface, the higher this thrust will be, which means that, for a given engine, the longer the spike, the greater the thrust. This results in a high-performance aerospike engine of significant longitudinal size, something which is highly undesirable in the domain of space.

SUMMARY OF THE INVENTION

The object of the present invention is to remedy this drawback.

To this end, according to the invention, the engine for a space launcher, particularly appropriate for propelling the upper stage of such a launcher, said engine having a longitudinal axis and comprising:

a central spike coaxial with said longitudinal axis and comprising a functional lateral surface at least approximately in the shape of a cone the base of which is arranged on the engine side; and means generating pressurized gaseous flow, these means being arranged at the periphery of said base of the functional lateral surface and generating pressurized gaseous flows that strike said functional lateral surface, is notable in that, at the opposite end to said base, the pointed end of said central spike consists of a deformable structure that can adopt:

either a folded position, for which said point of said central spike is truncated, the lateral surface of said central spike then being shorter than said functional lateral surface;

or a deployed position for which the lateral surface of said central spike corresponds to said functional lateral surface.

Thus, by virtue of the present invention, the engine may, outside of its phase of operation, exhibit a limited length (when the deformable structure is in folded position), whereas, in operation, said deformable structure is in the deployed position and said engine comprises the spike of a shape and length appropriate to its correct operation, with a high specific impulse.

It will be noted that, at its pointed end, said spike is subjected to lower thermomechanical stresses than it is at its base. Hence, said deformable structure could be of the inflatable bladder type. However, as a preference, said deformable structure comprises a foldable but inextensile wall which, in the deployed position, forms the pointed end of said central spike, the opposite end to said base. This foldable wall may comprise a plurality of rings, which are coaxial with said longitudinal axis and connected to one another in the manner of an accordion by circular articulation lines. Such a foldable wall is preferably produced using carbon fiber, for example a dry carbon cloth or a carbon mat, internally lined with a layer of elastomer affording thermal insulation and providing sealing. Thus, said deformable structure can move from its folded position to its deployed position under the action of a pressurized gas.

It will be noted that, in known central spike engines, the fuel and the oxidizer are contained in tanks which are pressurized by a gas (helium) contained in at least one third tank, and that this third tank is generally housed in the pointed end of said spike. Such an arrangement of said third tank is therefore an impediment in putting the present invention into full effect. Hence, according to another feature of the engine according to the invention, said third tank is housed in one or other of said tanks containing the fuel and the oxidizer, respectively. Thus, it frees up the space inside the pointed end of the spike, which can thus be configured as a foldable and deployable deformable structure. In addition, it is advantageous to use the gas of said third tank to actuate said foldable wall described hereinabove.

BRIEF DESCRIPTION OF THE DRAWINGS

The figures of the attached drawing will make it easier to understand how the invention may be achieved. In these figures, identical references denote similar elements.

DETAILED DESCRIPTION OF THE INVENTION

Figure 1:
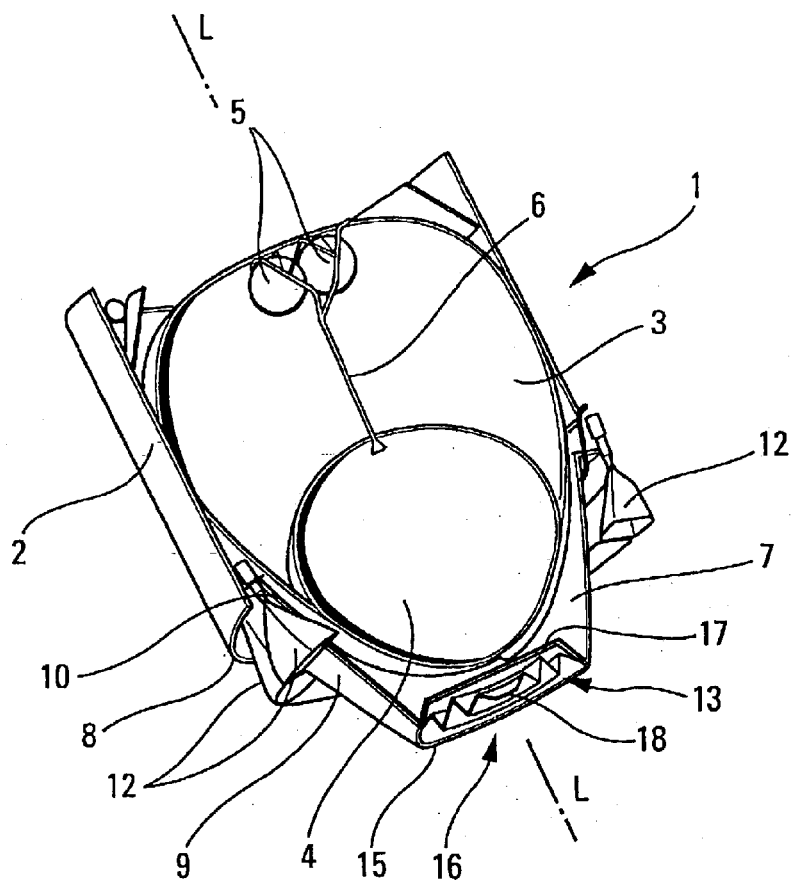
FIG. 1 is an axial section in perspective of one embodiment of the engine for a space launcher according to the present invention, the central spike of said engine being depicted truncated at its opposite end to this engine.
Figure 2:
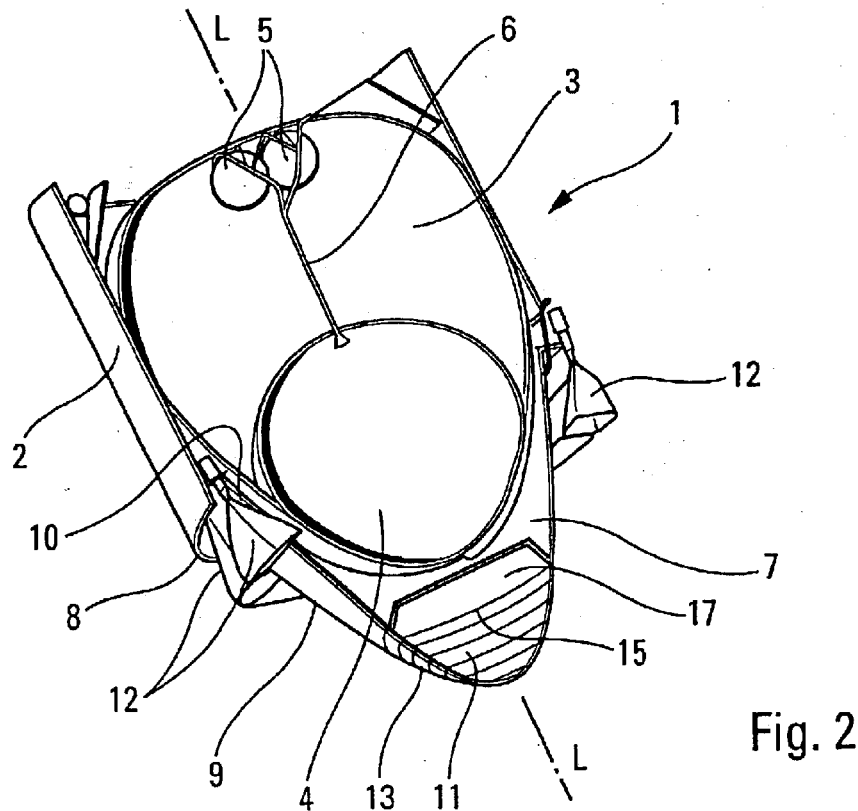
FIG. 2 is a view similar to that of FIG. 1, the central spike being deployed.

The engine 1 for a space launcher according to the present invention and depicted schematically in FIGS. 1 and 2 has a longitudinal axis L—L and comprises a hollow cylindrical casing 2, inside which there are housed a fuel tank 3 (the fuel being based on hydrogen) and an oxidizer tank 4 (the oxidizer being based on oxygen). In actual fact, the oxidizer tank 4 lies inside the fuel tank 3. The same is true of two spherical tanks 5, containing a pressurized gas (helium) whose task is to pressurize the tanks 3 and 4, by virtue of pipes, like the one bearing the reference 6.

The engine 1 additionally comprises a central spike 7, coaxial with said longitudinal axis and projecting from said hollow casing 2, through the open rear aperture 8 thereof. The central spike 7 has a functional lateral surface 9 at least approximately in the shape of a cone the base 10 of which is arranged at the engine end. In FIG. 2, the pointed end 11 of said central spike 7, the opposite end to said base 10, is depicted as being of rounded shape.

Distributed peripherally around the base 10 of the spike 7 are a plurality of gas generators 12, each of which generates an individual pressurized gaseous flow able to strike said functional lateral surface 9.

As illustrated in FIGS. 1 and 2, the pointed end 11 of the central spike 7 consists of a deformable structure able to adopt:

either a folded position (FIG. 1) for which said central spike 7 is truncated at the opposite end to the base 10, said central spike 7 thus being shortened and having a smaller lateral surface than said functional lateral surface 9;

or a deployed position (FIG. 2) for which said central spike adopts its functional configuration.

Figure 3:
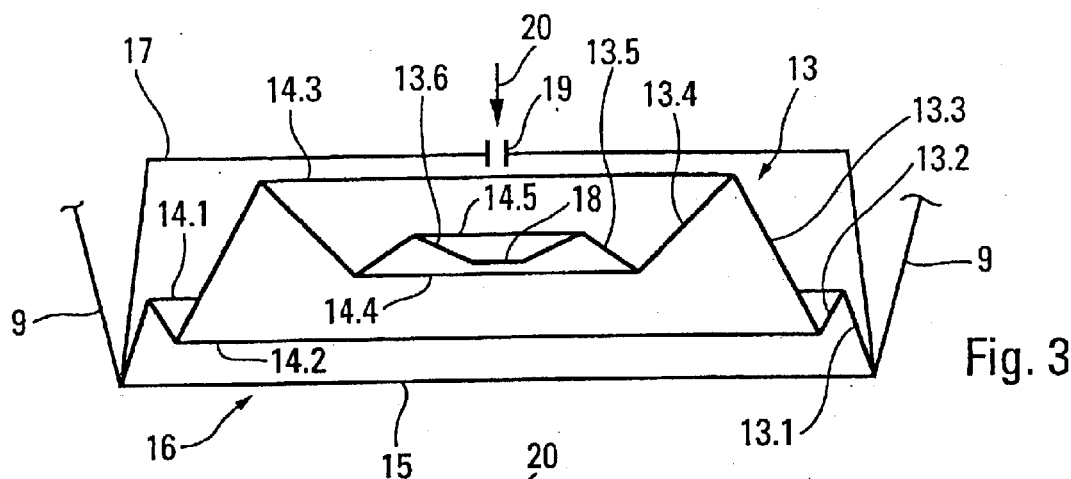
FIG. 3 illustrates, schematically and in a simplified way, one embodiment of a deformable structure for the end part of said central spike, said structure being depicted folded.
Figure 4:
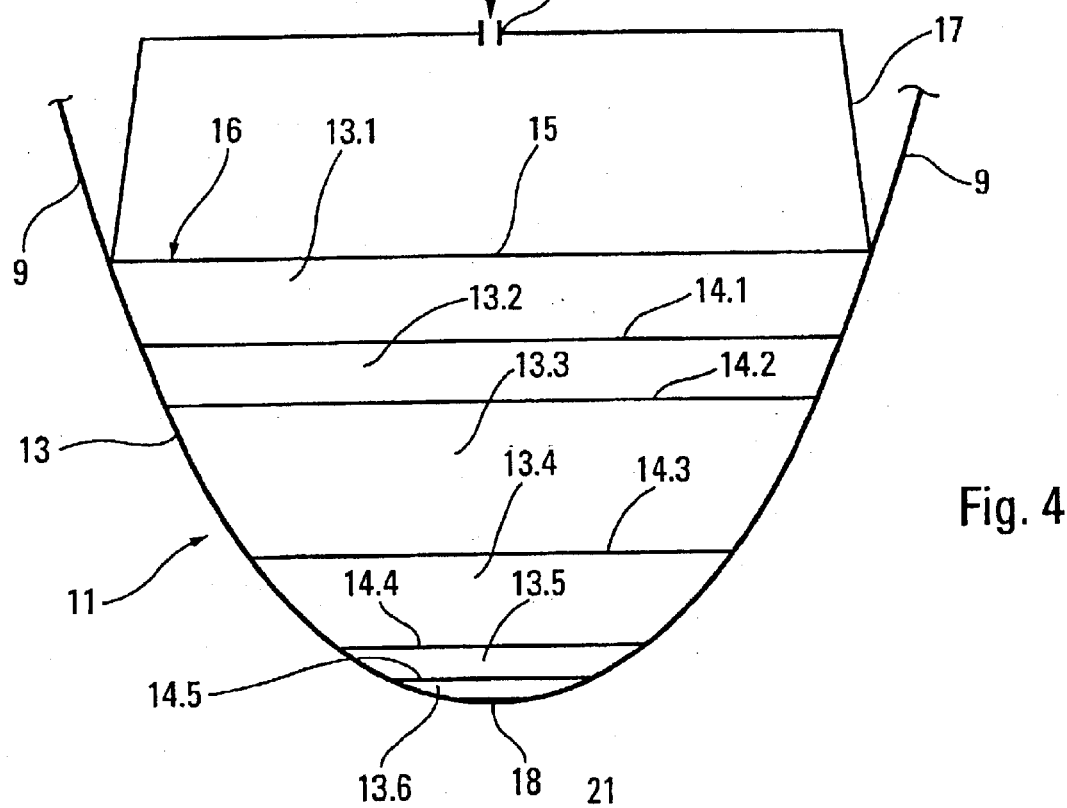
FIG. 4 shows said end part in the deployed position.

FIGS. 3 and 4 schematically depict a preferred embodiment of the deformable structure of said pointed end 11. This comprises a foldable but inextensile wall 13 consisting of a plurality of concentric rings 13.1 to 13.6 connected to one another, in the manner of an accordion, by fold lines 14.1 to 14.5. In addition, the largest ring 13.1 is articulated in a sealed fashion, by a fold line 15, to the edge of the aperture 15 of a casing 17 connected to the lateral wall 9, whereas the smallest ring 13.6 is closed off by a wall portion 18.

In the folded position (see FIGS. 1 and 3), the foldable wall 13 is entirely housed inside the casing 17, whereas, in the deployed position (see FIGS. 2 and 4), the foldable wall 13 is entirely arranged outside the casing 17 and exhibits the pointed shape 11.

The passage of the wall 13 from its folded position to its deployed position is advantageously obtained by introducing a pressurized gas into the casing 17 through an orifice 19 thereof, as symbolized schematically by the arrow 20. This pressurized gas comes, for example and advantageously, from said tanks 5.

Figure 5:
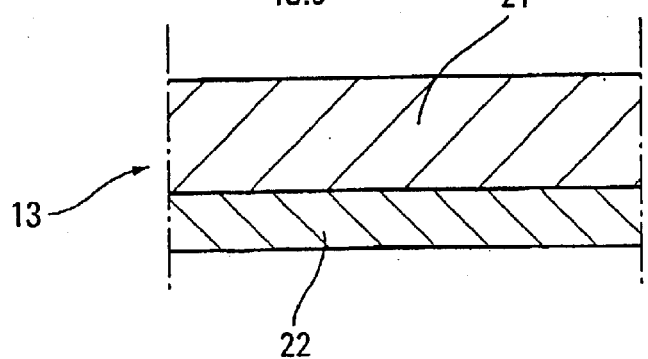
FIG. 5 is a schematic section, on a larger scale, giving one exemplary embodiment of the wall of which the deformable structure of FIGS. 3 and 4 is made.

The foldable wall 13 may consist of at least one layer 21 of a dry carbon cloth or a carbon mat, internally lined with at least one sealing and heat shield layer 28, for example made of an elastomer (see FIG. 5). The rings 13.1 to 13.6 and the fold lines 14.1 to 14.5 are marked in the wall 13 at the time of manufacture thereof.

What is claimed is:

1. An engine for a space launcher, said engine having a longitudinal axis and comprising:

a central spike coaxial with said longitudinal axis and comprising a functional lateral surface at least approximately in the shape of a cone, the base of which is arranged on the engine side; and a plurality of individual generators arranged at the periphery of said base of the functional lateral surface and generating pressurized gaseous flows that strike said functional lateral surface, wherein:

at the opposite end to said base, the pointed end of said central spike comprises a foldable inflatable structure, having a foldable but inextensible wall, that is operable to adopt alternatively:

a folded position, for which said central spike is truncated at the opposite end to said base, the lateral surface of said central spike then being shorter than said functional lateral surface, and exhibiting a lateral surface smaller than the functional lateral surface; and an unfolded position for which the lateral surface of said central spike corresponds to said functional lateral surface, wherein:

said foldable structure forms said pointed end of said central spike.

2. The engine as claimed in claim 1, wherein said foldable wall comprises a plurality of concentric rings connected to one another, in the manner of an accordion, by circular folding lines.

3. The engine as claimed in claim 1, wherein said foldable wall is produced using carbon fiber.

4. The engine as claimed in claim 3, wherein said foldable wall is lined with at least one layer of elastomer.

5. The engine as claimed in claim 1, comprising a first and a second tank, these respectively containing a fuel and an oxidizer, said tanks being pressurized by a gas contained in at least one third tank, wherein said pressurized gas coming from said third tank inflates said foldable structure from said folded position to said unfolded position.

6. The engine as claimed in claim 1, comprising a first and a second tank, these respectively containing a fuel and an oxidizer, said tanks being pressurized by a gas contained in at least one third tank, wherein said third tank is housed in said first tank containing the fuel.

7. The engine as claimed in claim 1, comprising a first and a second tank, these respectively containing a fuel and an oxidizer, said tanks being pressurized by a gas contained in at least one third tank, wherein said third tank is housed in said second tank containing the oxidizer.

* * * * *